(12) United States Patent
Palmer

(10) Patent No.: US 7,882,538 B1
(45) Date of Patent: Feb. 1, 2011

(54) LOCAL CACHING OF ENDPOINT SECURITY INFORMATION

(75) Inventor: Matthew Palmer, Menlo Park, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 1071 days.

(21) Appl. No.: 11/346,062

(22) Filed: Feb. 2, 2006

(51) Int. Cl.
G06F 21/00 (2006.01)
G06F 21/20 (2006.01)
G06F 21/24 (2006.01)

(52) U.S. Cl. ............ 726/1; 726/2; 726/4; 726/14; 726/27; 713/150; 713/153; 713/182

(58) Field of Classification Search .......... 726/1, 726/2, 3, 4, 5, 6, 7, 8, 11, 12, 13, 14, 15, 726/17, 18, 21, 22, 23, 24, 25, 26, 27, 28, 726/29; 713/150, 151, 152, 153, 154, 155, 713/164, 170, 182, 185, 188; 709/201, 202, 709/203, 207, 217, 218, 219, 220, 223, 224, 709/225, 226, 227, 229, 231
See application file for complete search history.

(56) References Cited

U.S. PATENT DOCUMENTS

| | | | |
|---|---|---|---|
| 6,715,082 B1 * | 3/2004 | Chang et al. ............ 726/8 |
| 7,178,166 B1 | 2/2007 | Taylor et al. |
| 7,392,546 B2 | 6/2008 | Patrick |
| 2001/0037400 A1 * | 11/2001 | Raz et al. ............ 709/232 |
| 2002/0138763 A1 * | 9/2002 | Delany et al. ............ 713/201 |
| 2002/0174358 A1 * | 11/2002 | Wolff et al. ............ 713/200 |
| 2003/0055994 A1 * | 3/2003 | Herrmann et al. ............ 709/229 |
| 2003/0131245 A1 * | 7/2003 | Linderman ............ 713/176 |
| 2003/0158929 A1 * | 8/2003 | McNerney ............ 709/223 |
| 2003/0196114 A1 * | 10/2003 | Brew et al. ............ 713/201 |
| 2004/0111643 A1 * | 6/2004 | Farmer ............ 713/201 |
| 2004/0122910 A1 * | 6/2004 | Douglass et al. ............ 709/214 |
| 2004/0225657 A1 * | 11/2004 | Sarkar ............ 707/9 |
| 2005/0021977 A1 | 1/2005 | Oberst |
| 2005/0071658 A1 | 3/2005 | Nath et al. |
| 2005/0235352 A1 * | 10/2005 | Staats et al. ............ 726/14 |
| 2005/0240550 A1 * | 10/2005 | Armes et al. ............ 707/1 |
| 2005/0246767 A1 | 11/2005 | Fazal et al. |
| 2005/0251854 A1 * | 11/2005 | Shay ............ 726/2 |
| 2006/0026683 A1 | 2/2006 | Lim |

(Continued)

OTHER PUBLICATIONS

Office Action from U.S. Appl. No. 11/236,987, dated Sep. 25, 2009, 24 pp.

(Continued)

*Primary Examiner*—Taghi T Arani
*Assistant Examiner*—Kenneth Chang
(74) *Attorney, Agent, or Firm*—Shumaker & Sieffert, P.A.

(57) ABSTRACT

In general, the principles of this invention are directed to techniques of locally caching endpoint security information. In particular, a local access module caches endpoint security information maintained by a remote server. When a user attempts to access a network resource through an endpoint device, the endpoint device sends authentication information and health information to the local access module. When the local access module receives the authentication information and the health information, the local access module controls access to the network resource based on the cached endpoint security information, the authentication information, and a security state of the endpoint device described by the health information.

48 Claims, 7 Drawing Sheets

U.S. PATENT DOCUMENTS

| | | |
|---|---|---|
| 2006/0075502 A1 | 4/2006 | Edwards |
| 2006/0090208 A1* | 4/2006 | Smith .......................... 726/26 |
| 2006/0101517 A1 | 5/2006 | Banzhof et al. |
| 2006/0179472 A1 | 8/2006 | Chang et al. |
| 2007/0006288 A1* | 1/2007 | Mayfield et al. ............... 726/5 |
| 2007/0143824 A1 | 6/2007 | Shahbazi |
| 2007/0169171 A1* | 7/2007 | Kumar et al. .................. 726/2 |
| 2008/0172713 A1 | 7/2008 | Kamendje et al. |

OTHER PUBLICATIONS

Response to Office Action dated Sep. 25, 2009, from U.S. Appl. No. 11/236,987, filed Dec. 28, 2009, 16 pp.

Office Action from U.S. Appl. No. 11/236,987, dated Apr. 15, 2010, 25 pp.

Response to Office Action dated Apr. 15, 2010, from U.S. Appl. No. 11/236,987, filed Jul. 15, 2010, 16 pp.

Nortel Networks, Nortel Secure Network Access Architecture, Jul. 11, 2005, 15 pp.

* cited by examiner

LOCAL CACHING OF ENDPOINT SECURITY INFORMATION

TECHNICAL FIELD

The invention relates to computer networks, and, in particular, to security in computer networks.

BACKGROUND

A computer network is composed of a large collection of end-user devices (generally referred to herein as "endpoint devices") that access network resources provided by network servers or other devices. In other words, an endpoint device generally provides a user access to the resources provided by the servers or other devices. For example, a personal computer used in a home or office is often used as an endpoint device. On the other hand, servers or other devices that provide network resources generally employ multiple incoming and outgoing connections to concurrently provide the network resources to the endpoint devices. For instance, an electronic mail (e-mail) server likely services dozens or hundreds of connections from the endpoint devices as the users access the e-mail server to send and receive e-mail.

Because users often lack technical experience, endpoint devices often become misconfigured. For example, users may accidentally install viruses, spyware, or other software that can potentially damage the functionality of the endpoint device or compromise the security of the computer network to which the endpoint is coupled. Once affected, endpoint devices can inadvertently spread malicious software to the servers and possibly to other endpoint devices.

To overcome this problem, various companies have implemented endpoint device security software. In general, conventional security software determines whether an endpoint device contains malicious software. If malicious software is detected, the endpoint security software denies network access to the endpoint whereby the endpoint device is unable to access the network or is only allowed to access a server having anti-virus software or other software needed to address the problem. In other words, the defense system "quarantines" the affected endpoint.

SUMMARY

In general, embodiments consistent with the principles of the invention are directed to techniques to defend servers and other network resources against network attacks originating from endpoint devices within an enterprise. In one embodiment, an intermediate device includes a local access module that controls access from local endpoint devices to one or more remote servers of the enterprise. The local access module of the intermediate device may control access based on cached endpoint security information received from a remote server, an identity of a user of an endpoint device, a security state of the endpoint device, or combinations thereof.

For example, a system is described in which an access control server located at a central office maintains fine-grain endpoint security information. A local access module in an intermediate device in a local office may cache some or all of the endpoint security information locally. The local access module then applies the cached endpoint security information to control access of endpoint devices in the local office to servers and network resources based on the identity of a user requesting access as well as health information of the endpoint being used. For instance, the health information may describe whether the endpoint device contains malicious software (e.g. a virus or spyware), whether the endpoint has invalid configuration, or whether the endpoint has installed approved countermeasures (e.g., anti-virus software).

In one embodiment, a method comprises locally caching a set of endpoint security information maintained by a remote server that describes how to control access of an endpoint device to a network resource based on an identity of a user of the endpoint device and a security state of the endpoint device. In addition, the method comprises locally controlling access of a endpoint device to a network resource based on the cached endpoint security information, an identity of a user of the endpoint device, and a security state of the endpoint device.

In another embodiment, an intermediate network device comprises a local access module to locally cache a set of endpoint security information maintained by a remote server and to locally control access of a endpoint device to a network resource based on the cached endpoint security information, an identity of a user of the endpoint device, and a security state of the endpoint device. In this embodiment, the endpoint security information describes how to control access of an endpoint device to a network resource based on an identity of a user of the endpoint device and a security state of the endpoint device.

In another embodiment, a system comprises a network resource provided by a server coupled to a network and an endpoint device coupled to the network. In addition, the system includes an intermediate network device coupled to the network, wherein the intermediate network device comprising a local access module to locally cache a set of endpoint security information maintained by a remote server and to locally control access of a endpoint device to a network resource based on the cached endpoint security information, an identity of a user of the endpoint device, and a security state of the endpoint device. In this embodiment, the endpoint security information describes how to control access of an endpoint device to a network resource based on an identity of a user of the endpoint device and a security state of the endpoint device.

In another embodiment, the invention is directed to a computer-readable medium containing instructions. The instructions cause a programmable processor to locally cache a set of endpoint security information maintained by a remote server that describes how to control access of an endpoint device to a network resource based on an identity of a user of the endpoint device and a security state of the endpoint device. In addition, the instructions cause the processor to locally control access of an endpoint device to a network resource based on the cached endpoint security information, an identity of a user of the endpoint device, and a security state of the endpoint device.

The details of one or more embodiments of the invention are set forth in the accompanying drawings and the description below. Other features, objects, and advantages of the invention will be apparent from the description and drawings, and from the claims.

DETAILED DESCRIPTION

Figure 1:
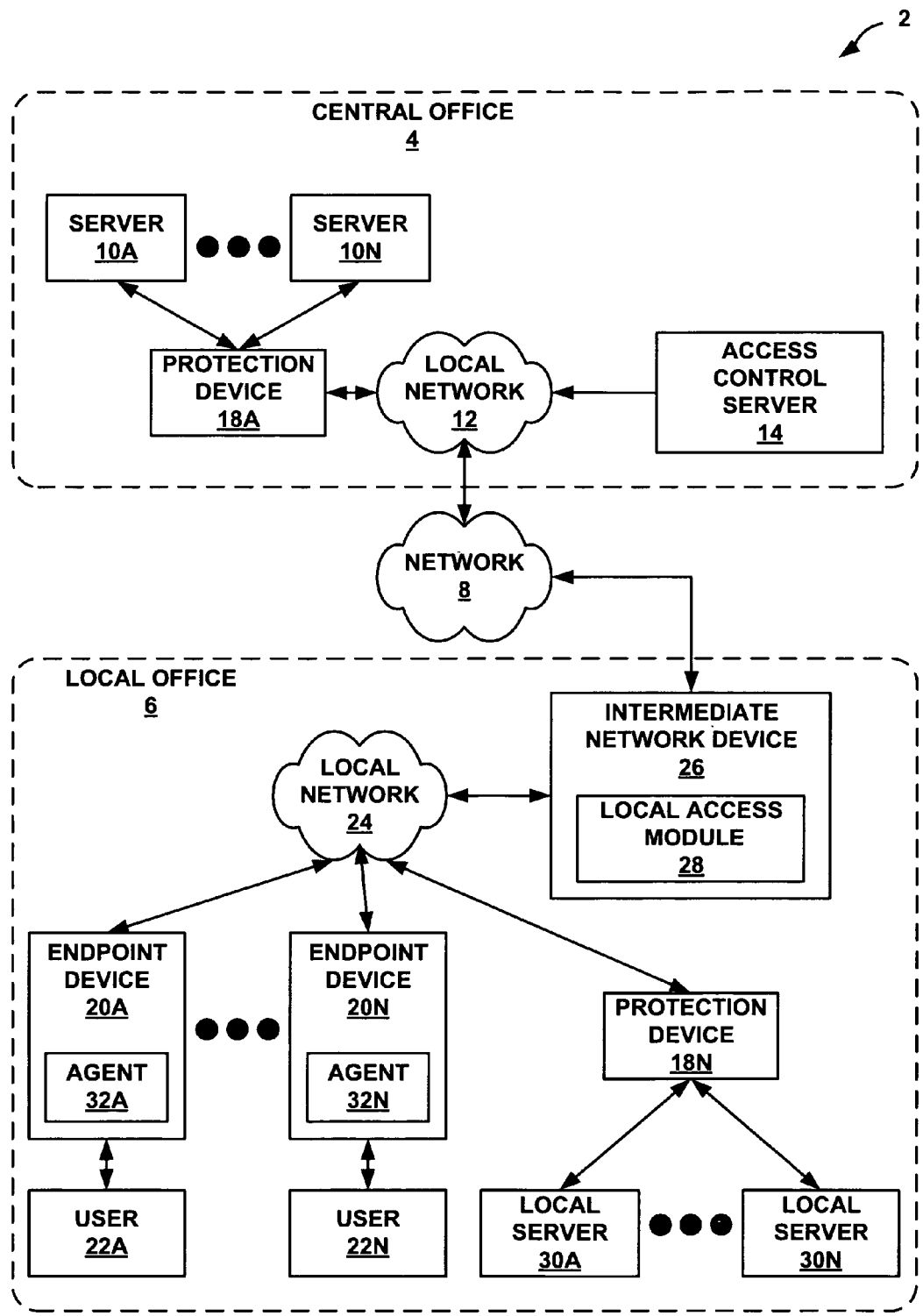
FIG. 1 is a block diagram illustrating an exemplary embodiment of an endpoint defense cache system.

FIG. 1 is a block diagram illustrating an exemplary endpoint defense cache system 2. In this example, an enterprise comprises a central office 4 and a local office 6, which may be located remotely from the central office. For instance, central office 4 may be a corporate headquarters while local office 6 may be a regional branch. A network 8 connects central office 4 with local office 6. Network 8 may be a private network or a public network such the Internet.

Local office 6 may contain several network devices connected through a local network 24. Moreover, local network 24 may be a public network, such as the Internet, or a private network, such as a local area network.

Within local office 6, users 22A through 22N (collectively, users 22) use endpoint devices 20A through 20N (collectively, endpoint devices 20), respectively. Endpoint devices 20 may be desktop or laptop computers, network-enabled mobile devices, network-based telephones, set-top boxes, cellular telephones, network televisions, or other devices. Endpoint defense agents 32A through 32N (collectively, agents 32) operate on endpoint devices 20A through 20N, respectively. Agents 32 may constitute software modules, ASICs, and the like. An agent collects authentication information about the user of its endpoint device and health information about its endpoint device. For example, agent 32 collects authentication information from user 22A and health information about endpoint device 20A.

In addition, local office 6 contains an intermediate network device 26 that provides an interconnection between local office network 24 and network 8. For example, intermediate network device 26 may be situated in local office network 6 in such a way that intermediate network device 26 may observe, intercept, and inject network communications departing from local office network 24 to network 8 and network communications arriving at local office network 6 from network 8. Intermediate network device 26 may be a firewall device, a network management device, a domain controller, a Remote Access Dial-In User Service (RADIUS) server, a session border controller, a virtual private network (VPN) server, a cache server, an edge router, a wide-area network optimization server, or another intermediate network device.

Central office 4 and local office 6 contain servers 10A through 10N (collectively, servers 10). In this example, central office 4 contains servers 10A through 10G and local office 6 contains servers 10H through 10N. Servers 10 may provide one or more network resources for the endpoint devices 20 of local office 6. For example, servers 10 be email servers, domain controllers, web services, print services, printers, network copiers, gateways, intelligent switches, hubs or other network access points or devices.

In addition, central office 4 and local office 6 contain protection devices 18A through 18N (collectively, protection devices 18). For example, protection devices 18 constitute firewalls, attack detection devices or other intermediate devices that identify network communications. Protection devices 18 control access of endpoint devices 20 to servers 10 based on device-specific access rights. In particular, protection devices 18 prohibit network communications flowing from an endpoint device from accessing a protected server when the endpoint device does not have sufficient device-specific access rights to communicate with the protected server. As shown in FIG. 1, protection device 18A in central office 4 controls access to servers 10A through 10G while protection device 18N in local office 6 controls access to servers 10H through 10N. Thus, protection device 18N may prohibit network communications flowing from endpoint device 20A to server 10G when endpoint device 20A does not have device-specific access rights to communicate with server 10G.

Central office 4 contains an access control server 14. Access control server 14 communicates with other devices in central office 4 through a local network 12. Access control server 14 in central office 4 maintains a set of endpoint security information. The set of endpoint security information instructs access control server 14 how to control access of an endpoint device to a network resource based on a user of the endpoint device and a security state of the endpoint device. For instance, the endpoint security information may instruct access control server 14 how to generate device-specific access rights for an endpoint.

A local access module 28 in intermediate network device 26 may cache some or all of the endpoint security information maintained by access control server 14. Local access module 28 may then locally control access of an endpoint device to a network resource based on the cached endpoint security information, an identity of a user of the endpoint device, and a security state of the endpoint device.

In one embodiment, the set of endpoint security information contains sets of authentication information, user role policies, endpoint health policies, and protection device policies. The set of authentication information contains information useful to authenticating a user. For instance, the set of authentication information may contain a username and password for each of users 22. The set of user role policies may contain a mapping between a username of one of users 22 and a list of roles associated with the user. The set of endpoint health policies may contain mappings between health indicators and lists of roles that may not be associated with the health indicators. In general, the term "health information" is used herein to generally refer to data that describes a security state of one of endpoint devices 20. For example, the health information may describe an endpoint device contains malicious software (e.g. a virus or spyware), whether the endpoint device has invalid configuration, or whether approved countermeasures (e.g., anti-virus software) have been properly installed on the endpoint device. The set of protection device policies may contain a mapping between actions to be performed by protection devices 18 on network communications from an endpoint and lists of roles associated with endpoints. For example, a protection device policy may contain a mapping between the "Engineer" role and the action "drop network communication." In this example, protection devices 18, would drop a network communication from any endpoint associated with the "Engineer" role.

When a user attempts to access a network resource provided by servers 10 through an endpoint device, local access module 28 or access control server 14 may perform an access right generation process. At the end of the access right generation process, local access module 28 or access control server 14 generates device-specific access rights for the endpoint device based on the endpoint security information, the identity of the user currently associated with the endpoint, and the security state for that particular endpoint device (referred to as the "health information" of the endpoint). Subsequently, protection devices 18 may govern whether the particular endpoint device may communicate with a network resource based on the device-specific access rights generated for that particular endpoint device. During this access right generation process, local access module 28 may attempt to retrieve a portion of the endpoint security information when the cached endpoint security information is not a current version of the endpoint security information maintained by access control server 14.

The access right generation process may begin when a user, such as user 22A, attempts to access a network resource through an endpoint device, such as endpoint device 20A. When user 22A attempts to access the network resource, agent 32A on endpoint device 20A may prompt user 22A for authentication information. The authentication information may be a username and a standard password, a one-time password, a biometric (e.g., a fingerprint or retina scan), or a combination these examples or other data that identify users 22 individually or by role.

After collecting the authentication information, endpoint defense agent 32A may generate current health information that describes a security state of endpoint device 20A. The health information may take the form of a report listing a set of health indicators. A health indicator may be a negative feature such as the presence of a virus, spyware, or misconfigured software on the respective endpoint device. Alternatively, a health indicator may be a positive feature such as the presence of a software application like preferred anti-virus software or a spyware blocker.

Once agent 32A collects authentication information about user 22A and the health information about endpoint device 20A, agent 32A may send the authentication information and health information to intermediate network device 26 or access control server 14, depending on the configuration of endpoint defense caching system 2. If agent 32A sends the authentication and health information to access control server 14, intermediate network device 26 may transparently intercept the authentication and health information before the authentication and health information reaches access control server 14. Intermediate network device 26 may handle then the access right generation process on behalf of access control server 14. Regardless of whether agent 32A sends the authentication and health information directly to intermediate network device 26 or intermediate network device 26 intercepts the information, intermediate network device 26 transfers the authentication and health information to local access module 28.

After receiving the authentication information about user 22A from endpoint device 20A and health information that describes the security state of endpoint device 20A from endpoint device 20A, local access module 28 determines which device-specific access rights to generate for endpoint device 20A. For instance, local access module 28 may attempt to determine which device-specific access rights should be accorded to endpoint device 20A based on the identity of user 22A and the cached endpoint security information. Next, local access module 28 may restrict these device-specific access rights based on the security state of endpoint device 20A and the cached endpoint security information.

To determine which device-specific access rights local access module 28 should be accorded to endpoint device 20A based on the identity of user 22A, local access module 28 may first determine whether user 22A is actually the user using endpoint device 20A. In other words, local access module 28 may authenticate the authentication information received from endpoint device 20A. Specifically, local access module 28 may determine whether a current version of a set of authentication information in the endpoint security information for user 22A is cached locally. If local access module 28 determines that a current version of the authentication information for user 22A is cached locally, local access module 28 may retrieve the authentication information for user 22A from the local cache. Subsequently, local access module 28 may determine whether a password in the received authentication information matches a password in the cached authentication information for user 22A. If the passwords match, local access module 28 may be satisfied that user 22A is in fact the user using endpoint device 20A. If the passwords do not match, local access module 28 may generate device-specific access rights that deny endpoint device 20A access to the network resources.

On the other hand, if local access module 28 determines that the authentication information for user 22A is not cached locally, local access module 28 requests the authentication information for user 22A from access control server 14. If local access module 28 receives the authentication information for user 22A, local access module 26 may cache the authentication information for user 22A locally. Local access module 26 may then proceed in the same way as when the authentication information for user 22A is already cached locally.

Once local access module 28 determines that user 22A is in fact the user using endpoint device 20A, local access module 28 may then determine which user roles are associated with the identity of user 22A. Specifically, local access module 28 may determine whether a current version of a user role policy for user 22A is cached locally. If local access module 28 determines that a current version of the user role policy for user 22A is cached locally, local access module 28 retrieves the user role policy for user 22A from the local cache. As discussed above, the user role policy lists roles with which user 22A is associated. For instance, the user role policy of user 22A may associated user 22A with the "Engineer" role.

On the other hand, if local access module 28 determines that a current version of the user role policy for user 22A is not cached locally, local access module 28 requests the current version of the user role policy for user 22A from access control server 14. If local access module 28 receives the user role policy for user 22A from access control server 14, local access module 28 caches the user role policy locally. Local access module 26 then proceeds in the same way as when the user role policy for user 22A is already cached locally.

After determining which user roles are associated with user 22A, local access module 28 may determine which of these user roles are invalid because of the security state of endpoint device 20A. Specifically, local access module 28 may determine whether a current of version of the set of the endpoint health policies are cached locally. If local access module 28 determines that a current version of the set of health policies are cached locally, local access module 28 compares the health information about endpoint device 20A to the set of endpoint health policies. As a result of this comparison, local caching device 20A may derive a list of user roles that are incompatible with access to the network resource. For example, if the health information reports that endpoint device 20A has a virus, then the "Engineer" role may be incompatible with to access to a network resource that is vulnerable to the virus.

On the other hand, if local access module 28 determines that a current version of the set of endpoint health policies is not cached locally, local access module 28 may request a current version of the set of endpoint health policies from access control server 14. If local access module 28 receives a current version of the set of endpoint health policies from access control server 14, local access module 28 may cache the current version of the set of endpoint health policies locally. Local access module 28 may then proceed in the same way as when the set of health policies is already cached locally.

After deriving the list of user roles that are incompatible because of the security state of endpoint device 20A, local caching device 28 may create a list of device-specific access rights for endpoint device 20A. Specifically, local caching device 28 may scan through the list of user roles derived from the user role policy for user 22A and remove all roles that are present on the list of roles that are incompatible because of the security state of endpoint device 20. In this way, local caching device 28 generates device-specific access rights that are user-specific (i.e., individualized for each of users 22), health-specific (i.e., set based on the current health state of the endpoint), resource-specific (i.e., specific to particular resource provided by one or more of central servers 10 or remote servers 30), or any combination thereof.

During an access right generation process for endpoint device 20A required information might not be locally cached and local access module 28 might not be able to retrieve the required information from access control server 14. In this situation, local access module 28 may deny all access rights to endpoint device 20A. Alternatively, local access module 28 may grant some provisional device-specific access rights to endpoint device 20A.

Once local access module 28 has generated the device-specific access rights for endpoint device 20A, local access module 28 communicates the device-specific access rights to protection devices 18. Protection devices 18 then control the access of endpoint device 20A to the network resource based on the device-specific access rights for endpoint device 20A and the set of protection device policies. As discussed above, the protection device policies inform protection devices 18 what action to perform when the protection devices 18 receive a network communication from an endpoint having a particular access right. For example, a protection device policy may inform protection devices 18 to prohibit or transparently forward a network communication from endpoint device 20A to server 10A when endpoint 22A is associated with the "Engineer" role. In this manner, protection devices 18 apply the fine-grain, device-specific access rights to control access to network resources provided by servers 10.

Endpoint defense caching system 2 may provide one or more advantages. For example, filtering certain network communications with protection devices 18 based on defined device-specific access rights generated by access control server 14 and/or local access module 28 may be faster and consume fewer resources than deep-scanning network communications for virus patterns or indicators of a network attack. Moreover, protection devices 18 may be placed anywhere in networks 12 and 24 to protect network resources, and the protection devices not need necessarily be configured to protect servers 10. Rather, an enterprise may deploy enough protection devices 18 to encourage compliance with the policies of the enterprise. For example, an enterprise may deploy a single protection device to prevent access to a critical network resource from the perspective of a user, e.g., email, thereby encouraging the user to bring the health of her endpoint device into compliance with the security policies of the enterprise. Furthermore, the role-based access control scheme of endpoint defense caching system 2 may provide enhanced flexibility with respect to user access to network resources. By assigning appropriate role memberships to users in an enterprise, the enterprise may control user access to specific servers.

In addition, by handling the access right generation process locally with cached endpoint security information, local access module 28 may facilitate relatively quick and reliable authentication for multiple users. Further, handling the access right generation process locally rather than maintaining endpoint security information locally eliminates the costs of installing an access control server at each local office. Furthermore, handling the access right generation process locally may reduce the load experienced by a central access control server. In addition, local access module 28 may authenticate a user and endpoint device even when remote authentication is not possible due to network delay or interruption. This may be particularly useful when a network connection to access control server 14 is delayed or interrupted.

Figure 2:
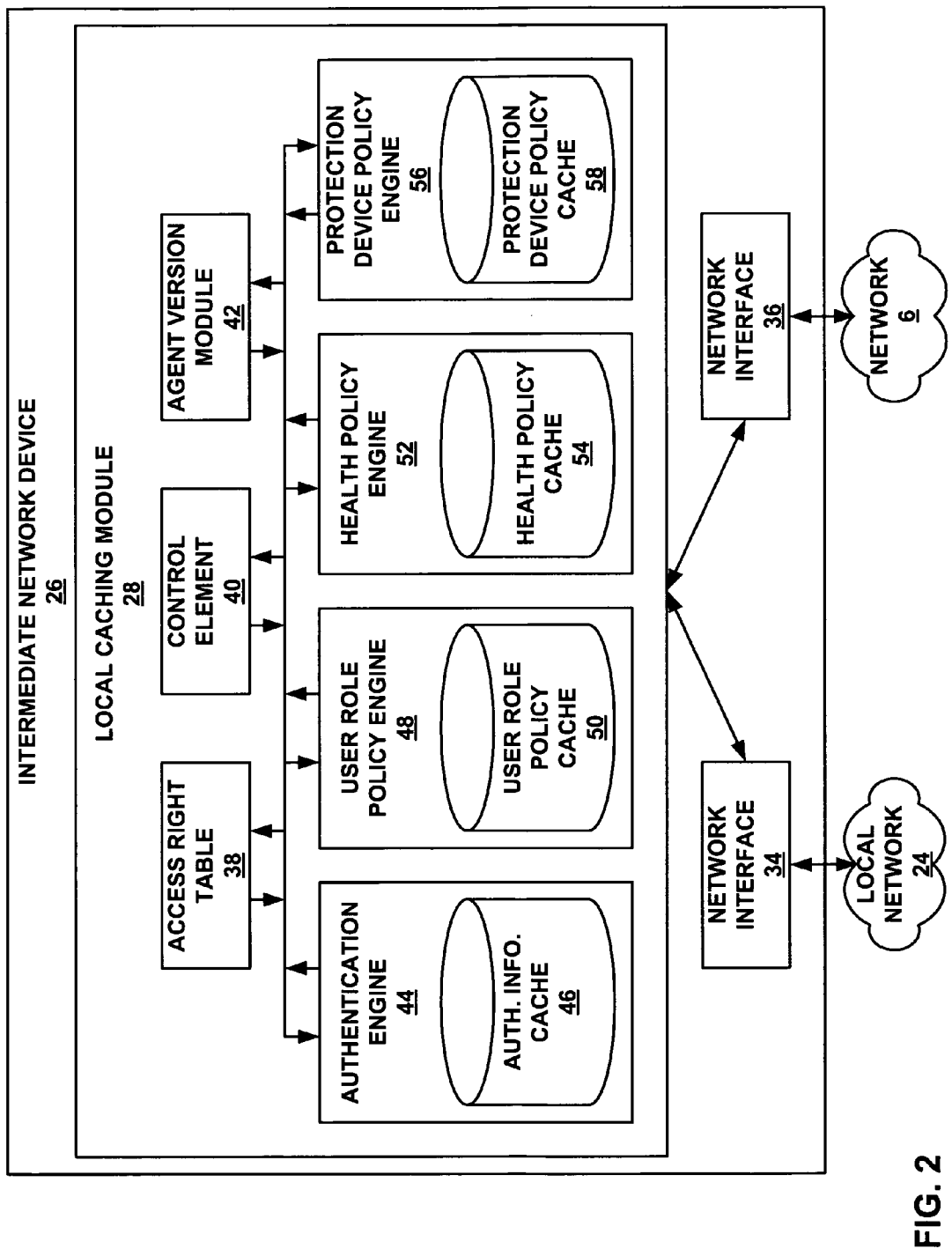
FIG. 2 is a block diagram illustrating an exemplary embodiment of an intermediate network device having a local access module.

FIG. 2 is a block diagram illustrating an exemplary embodiment of intermediate network device 26. As illustrated in FIG. 1, intermediate network device 26 includes local access module 28. In addition, intermediate network device 26 includes a first network interface 34 that connects the intermediate network device to network 24. Intermediate network device 26 also includes a second network interface 36 that connects the intermediate network device to network 8.

In this exemplary embodiment, local access module 28 includes an access right table 38, a control element 40, and an agent version module 42. Further, local access module 28 contains an authentication engine 44 that includes an authentication information cache 46, a user role policy engine 48 that includes a user role policy cache 50, a health policy engine 52 that includes a health policy cache 54, and a protection device policy engine 56 that includes a protection device policy cache 58. The various components of local access module 28 may be implemented in hardware, firmware, software of any combination thereof. Aspects implemented in software may be embodied as instructions executable by one or more processors, such as a microprocessor, microcontroller or digital signal processor (DSP). Aspects implemented in hardware or software may be implemented by discrete or integrated logic circuitry, such as an application specific integrated circuit (ASIC), field programmable gate array (FPGA), and associated memory.

When user 22A on endpoint device 20A attempts to use a protected network resource, agent 32A on endpoint device 20A may send authentication information about user 22A and health information about endpoint device 20A to local access module 28. In addition, agent 32A may send an agent version number to local access module 28 along with the authentication and health information.

When local access module 28 receives the agent version number, agent version module 42 may check whether the agent version number is current. If the agent version number is not current, then agent 32A might be outdated and not generate the correct authentication or health information. In this situation, agent version module 42 may send a current version of the agent software to agent 32A. After installing the current version of the agent software, agent 32A may resend the authentication and health information. This time, the agent version number should be current. Agent version module 42 may periodically check with access control server 14 to ensure that agent version module 42 contains the most recent version of the agent software.

If the agent version number is current, control element 40 determines whether to accept that user 22A is in fact the current user of endpoint device 20A. In particular, control element 40 may forward the authentication information to authentication engine 44. Subsequently, authentication engine 44 attempts to authenticate the identity of user 22A. In particular, authentication engine 44 may determine whether the authentication information cache 46 caches authentication information for user 22A. If authentication engine 44 determines that authentication information cache 46 does not contain authentication information for user 22A, authentication engine 44 may request a current version of the authentication information for user 22A from access control server 14. If authentication engine 44 is able to retrieve authentication information in the endpoint security information for user 22A, authentication engine 44 may store the authentication information in authentication information cache 46. Otherwise, if authentication engine 44 determines that authentication information cache 46 contains authentication information for user 22A, authentication engine 44 may retrieve the authentication information from authentication information cache 46.

Assuming that authentication engine 44 is able to retrieve authentication information for user 22A, authentication engine 44 caches the authentication information for user 22A in authentication information cache 46. Authentication engine 44 then uses the cached authentication information and the authentication information from endpoint device 20A to authenticate user 22A. For example, authentication engine 44 may authenticate user 22A by comparing a username and password in the cached authentication information with a username and password sent in the authentication information from endpoint device 20A. Authentication engine 44 then alerts control element 40 whether the authentication information from endpoint device 20A was successfully authenticated.

If authentication engine 44 did not accept the authentication information from agent 32A, control element 40 may alert endpoint device 20A that the authentication information was not accepted. Endpoint device 20A may then resubmit the authentication information.

On the other hand, if authentication engine 44 accepts that user 22A is the current user of endpoint device 20A, control element 40 determines which user roles are associated with user 22A. In particular, control element 40 may forward the username portion of the authentication information for user 22A to user role policy engine 48. Subsequently, user role policy engine 48 determines whether the user role policy cache 50 contains a user role policy for user 22A. As discussed above, a user role policy may be a mapping between a username and a list of roles. If user role policy engine 48 determines that user role policy cache 50 does not contain a user role policy for user 22A, authentication engine 44 requests a current version of the user role policy for user 22A from access control server 14. If authentication engine 44 is able to retrieve a user role policy for user 22A, user role policy engine 48 stores the user role policy in user role policy cache 50. Otherwise, if user role policy engine 48 determines that user role policy cache 50 contains a user role policy for user 22A, user role policy engine 48 retrieves the user role policy from user role policy cache 50.

Assuming that user role policy engine 48 is able to retrieve a user role policy for user 22A, user role policy engine 48 caches the user role policy for user 22A in user role policy cache 50. User role policy engine 48 then uses the user role policy for user 22A cached in user role policy cache 50 to determine which user roles user 22A is a member of. After determining which roles user 22A is associated with, user role policy engine 48 returns a list of user roles associated with user 22A to control element 40. For example, user role policy engine 48 may return the roles "Employees," "Engineering" and "Wireless Group" if user 22A is an employee engineer working in the wireless technology group of the enterprise.

After retrieving a list of user roles for user 22A, control element 40 forwards the health information about endpoint device 20A to health policy engine 52. The health information may take the form of a report listing whether endpoint device 20A passes or fails on a set of health indicators. Such health indicators may include whether a process is running on endpoint device 20A or whether a virus is present. For example, the health report for endpoint device 20A include the following health indicators:

|  |  | Version |
|---|---|---|
|  | Process Running? |  |
| Indicator 1: | AntiVirus.exe | 4.8 |
| Indicator 2: | SpyStopper.exe | 5.1 |
|  | Virus Not Detected? |  |
| Indicator 3: | BlasterWorm |  |

Using these health indicators, endpoint defense agent 32A may send a health report as follows:

| Indicator 1: | Passed |
|---|---|
| Indicator 2: | Passed |
| Indicator 3: | Failed |

This example health report reveals that endpoint device 20A is currently running Antivirus version 4.8 and SpyStopper version 5.1. However, the health report shows that endpoint device 20A is currently hosting the "BlasterWorm" virus.

Upon receiving the health information, control element 40 forwards the health information to health policy engine 52. Subsequently, health policy engine 52 determines which user roles are incompatible with access to network resource, given the security state of the endpoint device. In particular, health policy engine 52 determines whether health policy cache 54 contains a current version of a set of health policies for endpoint defense cache system 2. If health policy engine 52 determines that health policy cache 54 contains a current version of the set of health policies, health policy engine 52 retrieves the health policies from the health policy cache. Health policy engine 52 then uses the health policies cached in health policy cache 54 to generate a list of user roles which are incompatible with access of endpoint device 20A to the network resource given the security state of endpoint device 20A. Health policy engine 52 then returns this list of incompatible roles to control element 40.

On the other hand, if health policy engine 52 determines that health policy cache 54 does not contain a current version of the set of health policies, health policy engine 52 requests a current version of the health policies in the endpoint security information from access control server 14. If health policy engine 52 is able to retrieve a current set of health policies from access control server 14, health policy engine 52 stores the current set of health policies in health policy cache 54. Health policy engine 52 then generates the list of incompatible role in the same manner as when health policy cache 54 already contains the current version of the health policies.

Continuing the above example, health policy cache 54 may contain the following health policies:

| Health Indicator | Roles Excluded On Fail |
|---|---|
| Indicator 1: | "Wireless Group" |
| Indicator 2: | "Employees" |
| Indicator 3: | "Engineering" |

In this example, health policy engine 52 returns the role "Engineering" because the "Blasterworm" is operating on endpoint device 20A. However, because endpoint device 20A is running Antivirus v. 4.8 and SpyStopper v. 5.1, health policy database 46 does not return the roles "Employees" or "Wireless Group".

After receiving the list of incompatible roles, control element 40 generates device-specific access rights based on the user roles returned by user role policy engine 48 and health policy engine 48. In particular, control element 40 may remove any user role in the list user roles returned by user role policy engine 48 that are on the list of incompatible roles returned by health policy engine 52. In the above example, user 22A is a member of the "Employees", "Engineering", and "Wireless Group" roles. After removing roles in the list of incompatible roles, user 22A is simply associated with the "Employees" and "Wireless Group" roles.

After generating the list of role memberships, control element 40 may update access right table 38 to include a set of device-specific access rights for endpoint device 20A. This set of device-specific access rights may be a mapping from the network address of endpoint device 20A to the list of role memberships of user 22A. For example, control element 40 may update access right table 38 to include the following entry for endpoint device 20A:

| Source Address | Roles |
|---|---|
| 125.125.125.001 | "Employees", "Wireless Group" |

When control element 40 updates in access right table 38, control element 40 sends the updated content of access right table 38 to protection devices 18. Protection devices 18 retain a copy of access right table 38 in their internal memory to use in filtering network communications.

If control element 40 is unable to send the updates in device-specific access rights to protection devices 18, protection devices 18 may take contingency actions. The contingency actions may include allowing access to all users, allowing access to no users, or allowing access only to current users.

In addition to sending the updated content of access right table 38, control element 40 determines whether control devices 18 contain a current set of protection device policies. As discussed above, protection device policies describe the actions protection devices 18 take when a network communication arrives from endpoint devices 20. In particular, control element 40 sends a request for the current set of protection device polices to protection device policy engine 56. Protection device policy engine 56 comprises a protection device policy cache 58 to locally cache protection device policies in the endpoint security information. In particular, protection device policy engine 56 may determine whether protection device policy cache 58 contains a current set of protection device policies. If protection device policy engine 56 determines that protection device policy cache 58 does not contain a current set of protection device policies, protection device policy engine 56 may request a protection device policy from access control server 14 when protection device policy cache 58 has not cached a current version of the protection device policy. If protection device policy engine 56 is able to retrieve the protection device policies from access control server 14, protection device policy engine 56 stores the protection device policies in protection device policy cache 58. Otherwise, if protection device policy engine 56 determines that protection device policy cache 58 contains a current set of protection device policies, protection device policy engine 56 retrieves the protection device policies and returns them to control element 40. Subsequently, control element 40 may send the protection device policy cached by protection device policy cache 58 to protection devices 18. Protection devices 18 may then prohibit communication from endpoint device 20A based on the protection device policy and the device-specific access rights of endpoint device 20A.

In this example, protection device policy cache 58 contains three columns: roles, destination address, and actions. The "role" column enumerates a list of roles to which the entry applies. The "action" column specifies whether protection devices 18 should drop the network communication or allow the network communication to proceed. The "destination address" column lists the servers to which the entry applies. For example, protection device 18A may protect the following five servers:

| IP address | Server Description |
|---|---|
| 1.1.1.1 | Email |
| 1.1.1.2 | Specification code control |
| 1.1.1.3 | Engineering marketing information |
| 1.1.1.4 | Proprietary wireless specifications |
| 1.1.1.5 | Install server for Antivirus software |

The data in each row of protection device policy cache 58 represents a policy that directs protection device 18A as to what action, if any, is to be applied given a set of roles and a destination address. Control element 40 distributes protection device policy cache 58 to protection devices 18.

When a network communication arrives, protection device 18A retrieves the device-specific access rights associated with the source address of the network communication and scans through its copy of protection device policy cache 58. Protection device 18A scans through its copy of protection device policy cache 58 from top to bottom. Thus, protection device 18A forwards or drops the communication as soon as it discovers an entry in protection device policy cache 58 that matches the roles associated with the network communication and the destination address given by the network communication. For example, consider the following table:

| Roles | Destination | Action |
|---|---|---|
| any | 1.1.1.5 | permit |
| NOT Employees | any | deny |
| any | 1.1.1.1 | permit |

-continued

| Roles | Destination | Action |
|---|---|---|
| Engineering | 1.1.1.2 | permit |
| Engineering, Marketing | 1.1.1.3 | permit |
| Wireless | 1.1.1.4 | permit |

The first entry permits users in any role to access the server at IP address 1.1.1.5 because, as listed above, the server having network address of 1.1.1.5 is the install server for antivirus software. For instance, both employees and outside contractors may access the antivirus software server. The second entry uses the "NOT" modifier on the set of roles. The "NOT" modifier means that the entry only applies if the user is not a member of the following role. In this case, the second entry denies access to all servers to all users not in the "Employees" role. Because protection device 18A evaluates the entries from top to bottom, a user not in the "Employees" role can still access the anti-virus server. The third entry permits access to the email server at 1.1.1.1 to members of all roles. However, because of the top to bottom evaluation of entries and the presence of the second entry, users not in the "Employees" role cannot access the email server. The other three entries define access to servers based on specific roles associated with the users. In this manner, the role-based security techniques have incorporated the use of health indicators and user identity to provide flexible, fine-grain security.

In other embodiments, protection device policies may be more complex. For example, a protection device policy may include a column listing a specific port associated with a destination network address. In addition, a protection device policy may include columns specifying which networking protocols endpoint device 20A may use in conjunction with a destination network address or specifying a range of network addresses. For example, a protection device policy may permit members of the "Engineering" role to access transmission control protocol ("TCP") port 80 of destinations 1.1.2.1 through 1.1.2.255.

Because network 8 is public, a malicious user could pretend to be intermediate network device 26 in order to receive endpoint security information, including passwords. The malicious user could then use the passwords to illegitimately access resources. To prevent this, network interface 34 includes certificates issued by a party trusted by both intermediate network device 26 and access control server 14. In addition, network interface 34 may implement a virtual private network (VPN) to ensure that communication is secure between access control server 14 and intermediate network device 26.

Local access module 28 may also cache endpoint security information before a user initiates an access right generation process. That is, local access module 28 may pre-cache authentication, user role policy, health policy, or protection device policy information from access control server 14. In one example, access control server 14 may "push" the endpoint security information to local access module 28 without a request from local access module 28. In another example, local access module 28 may periodically request endpoint security information from access control server 14. As discussed below, other pre-caching techniques may be considerably more complex.

Figure 3:
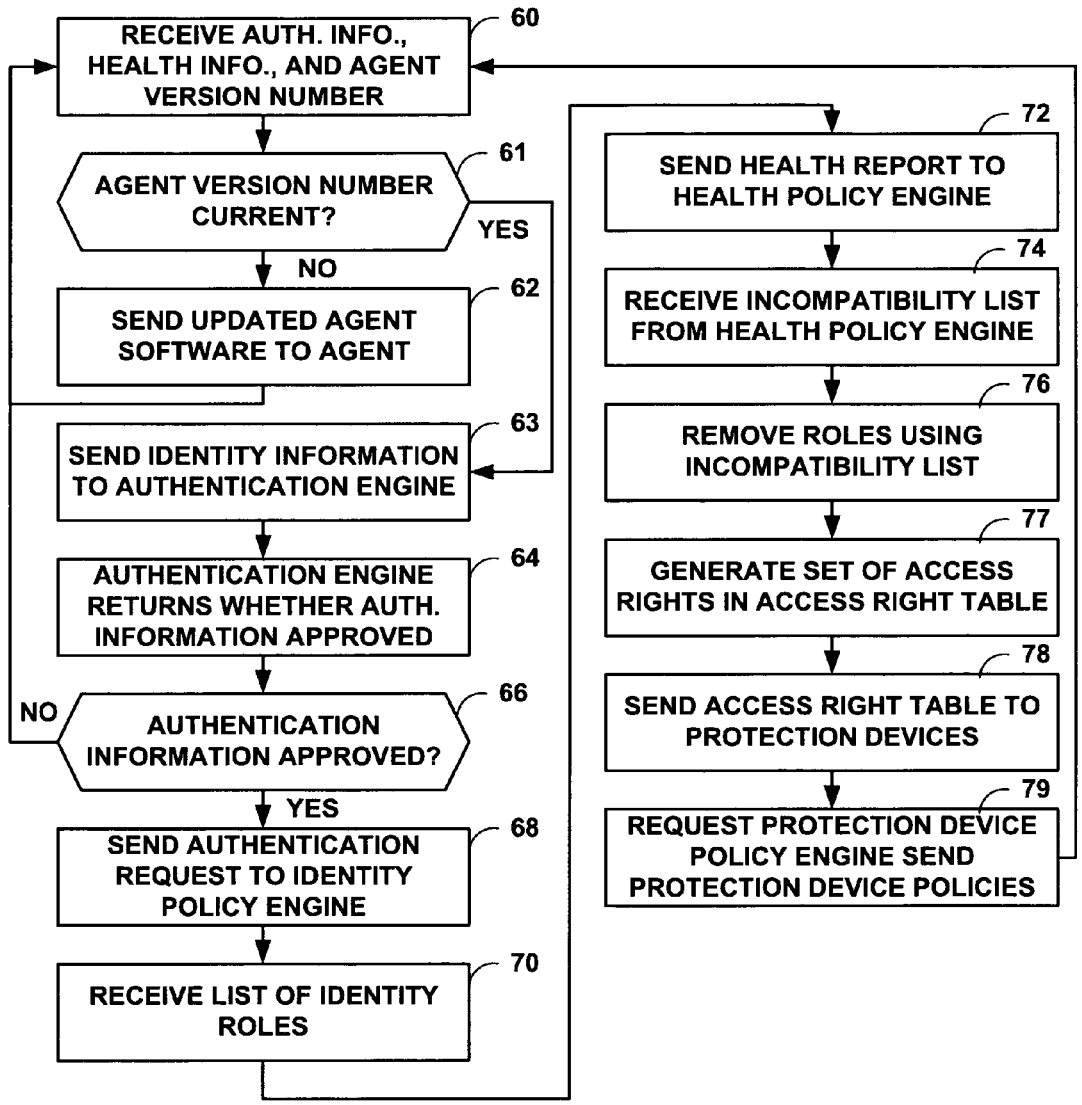
FIG. 3 is a flowchart illustrating an exemplary mode of operation for a control element in accordance with the principles of the invention

FIG. 3 is a flowchart illustrating an exemplary access right generation process performed by control element 40 in accordance with the principles of the invention. Initially, control element 40 receives authentication information about a user, health information about an endpoint, and an agent version number from an agent (60). For example, control element 40 may receive authentication information about user 22A, health information about endpoint device 20A from agent 32A. As described above, endpoint defense agent 32A may send a health report to local access module 28 prior to or at the time the authentication request is processed. For instance, endpoint defense agent 32A may send local access module 28 updated health information whenever endpoint defense agent 32A detects a change in a health indicator of endpoint device 20A. Such periodic updates help ensure that protection devices 18 have an accurate understanding of which users 22 presently belong to which roles. Alternatively, endpoint defense agent 32A may collect and communicate the health information at the time user 18A submits the authentication request.

After receiving the information from agent 32A, control element 40 determines whether the software that comprises agent 32A is current. In particular, control element 40 determines whether agent version number sent by agent 32A is current (61). If the agent version number is not current (NO of 61), agent version module 42 sends a current version of agent software to endpoint 20A (62). After agent 32A installs the current version of the agent software, 32A may send the authentication information, health information, and agent version number again (60).

If the agent version number is current (YES of 61), control element 40 sends the authentication information to authentication engine 44 (63). Authentication engine 44 verifies the authentication information and returns whether the authentication information is approved (64). If authentication engine 44 does not approve the authentication information (NO of 66), control element 40 may request endpoint device 20A to send the authentication information again.

If authentication engine 44 approves the authentication information (YES of 66), control element 40 may send a username from the authentication information to user role policy engine 48 (68). Subsequently, control element 40 receives a list of roles from user role policy engine 48 (70). Control element 40 next sends the health information to health policy engine 52 (72). Subsequently, control element 40 receives a list from health policy engine 52 of roles with which the health report is incompatible (74). Control element 40 then removes the roles returned by health policy database 30 from the list of roles returned by user role policy engine 48 (76). Using the remaining roles, control element 40 generates a set of device-specific access rights for endpoint device 20A in access right table 38 (77). Control element 40 communicates access right table 38 to protection devices 18, which apply actions to network communications based on the roles retrieved from access right table 38 (78). In addition, control element 40 may request protection device policy engine 56 to send protection device policies to protection devices 18 (79). At this point the access right generation process is complete and user 22A may be permitted to communicate with one or more network resources provided by at least local servers 30. In communicating with the network resources, endpoint device 20A may use cryptographic techniques (e.g., digital certificates and the Internet Protocol Secure (IPSec) protocol) to prevent network address mimic attacks.

Figure 4:
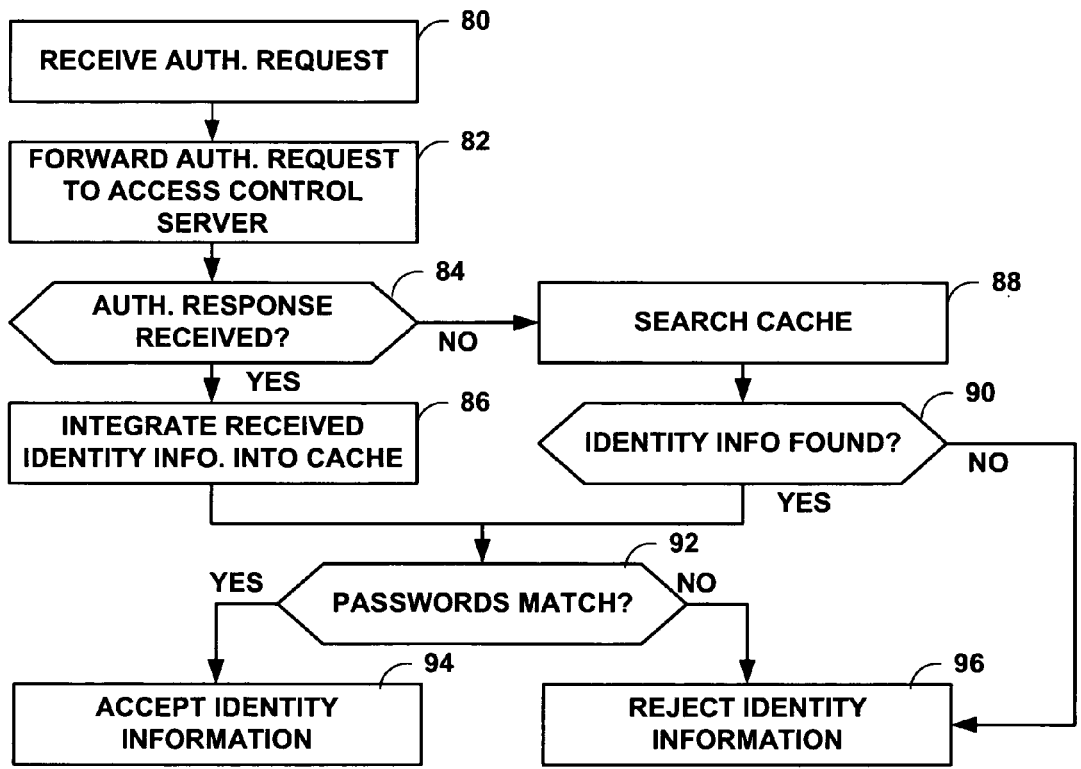
FIG. 4 is a flowchart illustrating an exemplary mode of operation of an authentication engine in a local access module in accordance with the principles of this invention.

FIG. 4 is a flowchart illustrating an exemplary operation of authentication engine 44 in accordance with the principles of this invention. Initially, authentication engine 44 receives authentication information for a user, e.g., user 22A, from control element 40 (80). The authentication information may comprise a username and password (80). In this embodiment, authentication engine 44 forwards the authentication information to access control server 14 (82). In some examples, authentication engine 44 first determines whether a network connection to access control server 14 is available before forwarding the authentication information to access control server 14, and only forwards the authentication information when the network connection is determined to be available. Authentication engine 44 then waits for a response from access control server 14. If authentication engine 44 receives a response from access control server 14 (YES of 84), authentication engine 44 integrates the received authentication information in the response into authentication information cache 46 (86). Authentication engine 44 then examines the cached authentication information to determine whether a password in the authentication information from user 22A matches a password for user 22A in the cached authentication information (92). If the passwords match (YES of 92), authentication engine 44 accepts the authentication information from endpoint device 20A (94). On the other hand, if the passwords do not match (NO of 92), authentication engine 44 rejects the authentication information from endpoint device 20A (96).

If, however, authentication engine 44 does not receive authentication information for user 22A from access control server 14 (NO of 84), authentication engine 44 searches authentication information cache 46 for authentication information for user 22A (88). In some examples, authentication engine 44 determines whether a network connection to access control server 14 is available. When authentication engine 44 determines that the network connection is not available, authentication engine 44 does not forward the authentication information, but instead searches authentication information cache 45 for authentication information for user 22A, without waiting for a response from access control server 14. If authentication engine 44 cannot find authentication information in authentication information cache 46 for user 22A (NO of 90), authentication engine 44 rejects the authentication information from endpoint device 20A (98). On the other hand, if authentication engine 44 finds authentication information for user 22A in authentication information cache 46 (YES of 90), authentication engine 44 determines whether a password in the authentication information from endpoint device 20A matches a password in the authentication information in authentication information cache 46 for user 22A (92). If authentication engine 44 determines that the passwords match (YES of 92), authentication engine 44 accepts the authentication information from endpoint device 20A (94). If the passwords do not match (NO of 92), authentication engine 44 rejects the authentication information from endpoint device 20A (96).

Figure 5:
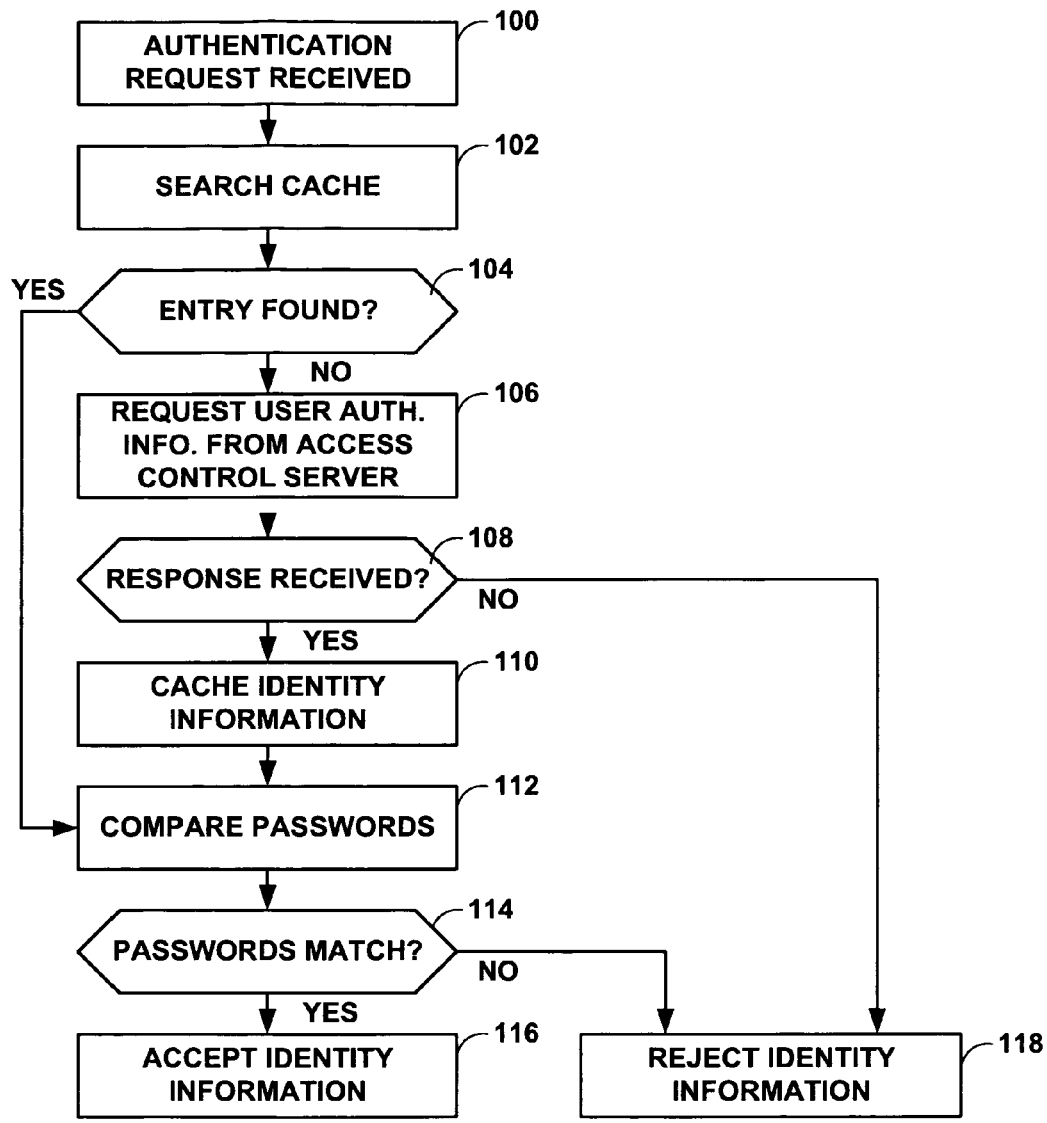
FIG. 5 is a flowchart illustrating an exemplary alternate mode of operation of an authentication engine in a local access module in accordance with the principles of this invention.

FIG. 5 is a flowchart illustrating an exemplary alternate mode of operation of authentication engine 44 in local access module 26 in response to receiving authentication information in accordance with the principles of this invention. Initially, authentication engine 44 receives authentication information from control element 40 (100). Control element 40 received this authentication information from an agent, e.g., agent 32A on endpoint device 20A. Specifically, the authentication information may contain a username, e.g., user 22A, and password.

Authentication engine 44 of local access module 28 uses the username of the authentication information to search authentication information cache 46 for a matching username (102). If authentication engine 44 cannot find a matching username in authentication information cache 46 (NO of 104), authentication engine 44 requests authentication information for user 22A from access control server 14 (106). If authentication engine 44 does not receive a response from access control server 14 before a timeout expires (NO of 108), authentication engine 44 considers the connection between local access module 28 and access control server 14 to have failed. Because authentication engine 44 is unable to validate the authentication information from endpoint device 20A, authentication engine 44 rejects the authentication information from endpoint device 20A.

On the other hand, if authentication engine 44 receives the authentication information from access control server 14 (YES of 108), authentication engine 44 caches the authentication information in authentication information cache 46 (110). Next, authentication engine 44 compares the password from the authentication information from endpoint device 20A with the password in the cached authentication information (112). This is the same as if local access module 28 had found an entry in authentication information cache 46 for the username supplied by the user. If the passwords match (YES of 114), authentication engine 44 accepts the authentication information from endpoint device 20A (116). Else, if the passwords do not match (NO of 114), authentication engine 44 rejects the authentication information from endpoint device 20A (118).

Figure 6:
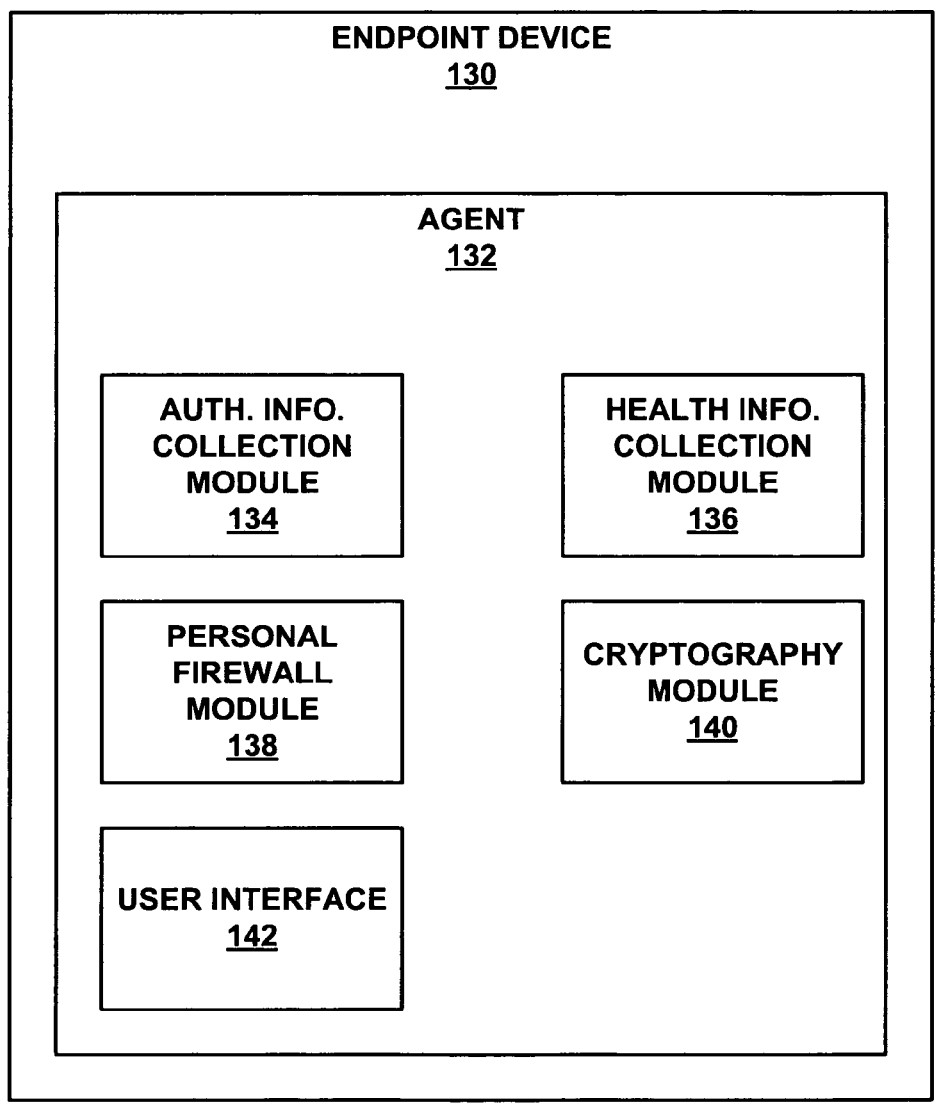
FIG. 6 is a block diagram illustrating an exemplary embodiment of an endpoint device.

FIG. 6 is a block diagram illustrating an exemplary embodiment of an endpoint defense agent 132 on endpoint device 130. Agent 132 may be any of endpoint defense agents 32 (FIG. 1) and endpoint device 130 may be any of endpoint devices 20. For purposes of explanation, continuing reference is made to FIG. 1. As shown in FIG. 6, agent 130 includes an authentication information collection module 134, a health information collection module 136, a personal firewall module 138, and a cryptography module 140.

Authentication information collection module 134 is responsible for collecting authentication information from a user when the user first attempts to access a network resource. Health information collection module 136 is responsible for collecting the health information about endpoint 130. Authentication information collection module 134 and health information collection module 136 may behave in several ways depending on the configuration of endpoint defense caching system 2. For instance, health information collection module 136 may be configured to generate and send health information about endpoint 130 to local access module 28 whenever health information collection module 136 detects a change in the security state of endpoint device 130.

Personal firewall module 138 adds an additional level of protection for endpoint device 130. Personal firewall module 138 operates in a manner similar to protection devices 18. That is, personal firewall module 138 controls access to endpoint 130 by applying protection device policies and device-specific access rights. Personal firewall module 138 locally monitors outbound network communications generated by software components (e.g., web browsers or other applications) executing on endpoint device 130, and applies actions on the network communications based on the device-specific access rights prior to sending the network communications to network 24. In this manner, personal firewall module 138 applies fine-grain, device-specific access rights to aid access control over network resources provided by servers 10.

In addition, personal firewall module 138 may control access of other endpoint devices 20 to endpoint device 130 by applying device-specific access rights and protection device policies to incoming network communications. In this way, personal firewall module 138 may thwart attacks sent by other endpoint devices 20.

Cryptography module 140 may apply network cryptographic techniques, such as application of the Internet Protocol Security (IPSec) protocol, when communicating with access control server 14, intermediate network device 26, and servers 10. The encrypted network communications may prevent certain attacks, such as malicious users or applications from spoofing a source network address.

In addition, agent 132 contains user interface 142 to allow users 22 to manage the health of endpoint device 130. For instance, user interface 142 may prompt a user to install or update anti-virus software in the event the preferred software is not currently loaded on endpoint device 130.

Figure 7:
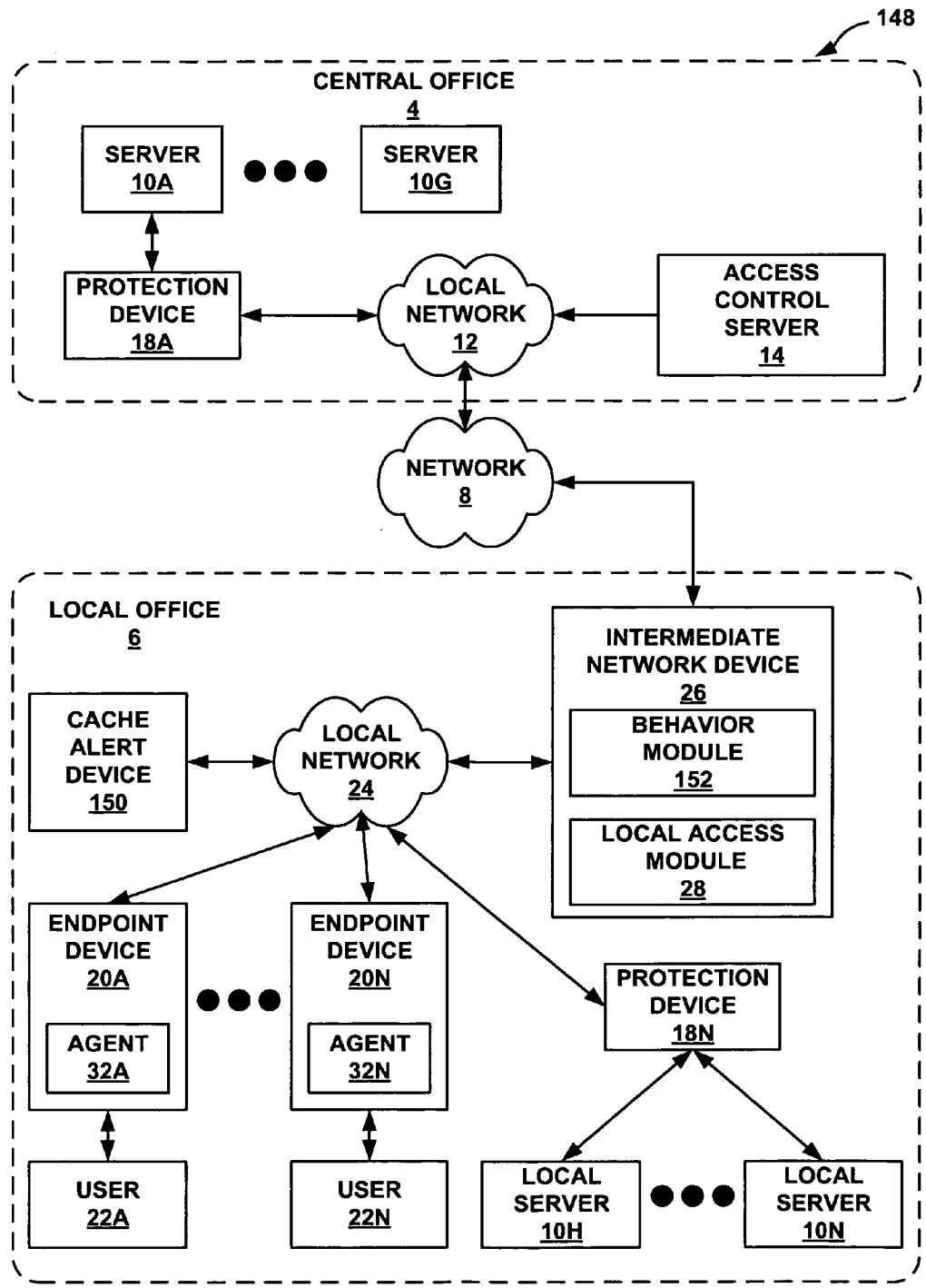
FIG. 7 is a block diagram illustrating an exemplary embodiment of an endpoint defense cache system that includes a cache-alert device.

FIG. 7 is a block diagram illustrating an exemplary embodiment of an endpoint defense caching system 148 that includes a cache-alert device 150. In FIG. 7, continuing reference is made to FIG. 1.

Cache alert device 150 may provide improved efficiency over the above-described caching strategy. For instance, waiting for a user to attempt authentication before retrieving the set of authentication information requires that the user wait while local access module 28 retrieves the passwords. The user may wait indefinitely if network 8 is highly congested or is not functioning.

Cache-alert device 150 may alleviate this problem by providing information to local access module 28 indicating whether a user is likely to attempt to access a network resource in the future. If so, local access module 28 may request a portion of the endpoint security information based on the determination. For example, local access module 28 may receive data about the activities of a user from cache-alert device 150. Local access module 28 may then process the data with a predictive behavior module 152 to determine whether the user is likely to attempt to access a network resource. In this example, predictive behavior module 152 may comprise a set of condition-action rules.

System 148 may be useful in many situations. For example, suppose that user 22A is an employee at an office. To enter the office, user 22A must swipe a badge through a card reader. The card reader, acting as cache-alert device 150, reports this action to local access module 28 via a local network 24. Because user 22A is likely entering the office to work, local access module 28 retrieves endpoint security information that permits user 22A to access the protected resources needed for work. Accordingly, by the time user 22A arrives at her desk, it is possible that local access module 28 has already obtained endpoint security information for user 22A.

Also, cache-alert device 150 may be helpful in obtaining endpoint security information for visiting users. For example, local access module 28 may maintain an updated set of endpoint security information for users known to be associated with a particular local office 6. When user 22A from a different office visits local office 6, however, it is necessary to obtain endpoint security information for user 22A. Cache-alert device 150 may be configured to detect the presence, arrival or intended future arrival of a visiting user 22A to a local office 6, and trigger local access module 28 to obtain pertinent endpoint security information from access control server 14.

Alternatively, cache-alert device 150 may be responsive to user input entered by a user within local office 6 who has been advised that user 22A will be visiting the local office. As a further example, cache-alert device 150 may be responsive to a message transmitted by visiting user 22A. In either case, cache-alert device 150 may trigger retrieval of endpoint security information from access control server 14 by local access module 28 so that local access module 28 may is readily authenticate visiting user 22A.

As another example, cache-alert device 150 may make use of information obtained using a satellite navigation system device such as a global position system (GPS) device. When user 22A enters a specific zone as determined by the GPS device, the GPS device alerts local access module 28 of the new location of user 22A, e.g., via a combination of wireless and wired network connections. Local access module 28 then retrieves the endpoint security information for user 22A from access control server 14. In this case, cache alert device 16 uses the GPS information to trigger retrieval of endpoint security information by local access module 28.

A GPS-based implementation of cache alert device 16 may be useful for military personnel who need maximum security and maximum speed of access to information. Local access module 28 may be installed at a local base while access control server 14 might be in the home country. Soldiers on patrol may then use endpoint security information cached at local access module 28 to authenticate for access to network resources. This process may be quicker than sending authentication requests back to access control server 14. This is because the distance between the soldiers and local access module 28 is less and the database of endpoint security information on local access module 28 is likely smaller than the database on access control module 28. Further, pre-caching endpoint security information may be especially valuable in a war zone where communication links, including links to remote access control module, may be fragile.

Users may employ similar methods with wireless networks. For example, suppose that cache-alert device 150 learns that a user is within range of a Wireless-Fidelity "hotspot." In this case, cache-alert device 150 may send alerts that prompt local caching devices in surrounding hotspots to cache endpoint security information for the user. In this way, if the user moves to one of the surrounding hotspots, a local caching device in that hotspot has endpoint security information waiting for the user. Cache-alert device 150 may perform similar functions when a user is located within range of wireless local area networks (WLAN), world wide interoperability for microwave access (WiMAX) networks, wireless broadband (WiBro) networks, broadband wireless access (BWA) networks, high performance radio metropolitan area networks (HIPERMAN), cellular networks, and other wireless networking technologies.

Local access module 28 may use a combination of factors to determine whether to retrieve endpoint security information for a user. For example, cache-alert device 150 may be configured to receive scheduling information about a user, such as travel itinerary and travel purpose information. If cache-alert device 150 detects that a user has purchased a plane ticket to a city where local access module 28 is located, the cache alert device may alert local access module 28 to retrieve endpoint security information for the user. If cache-alert device 150 also receives information indicating that the user has scheduled a vacation on the date of travel, however, the cache-alert device may cancel the alert to local access module 26. In this case, cache-alert device 150 determines that the user is probably not traveling to the city to visit the branch office. Consequently, local access module 28 does not obtain endpoint security information for the user.

The intelligence for interpreting travel information or alerts may be built into cache-alert device 150 or local access module 28 in the form of one or more software processes. Also, local access module 28 may be responsive to multiple cache-alert devices. Each time local access module 28 receives information from cache-alert device 150, local access module 28 may recalculate the probability that a user will attempt to use local access module 28 to authenticate in the near future.

If the probability is above a certain threshold, then local access module 28 obtains the endpoint security information from access control server 14. In some embodiments, local access module 28 may cache the endpoint security information based only on the user's travel to the vicinity of the local office 6 without regard to travel purpose. In addition, multiple local access modules 14 associated with multiple local offices in a particular region may simultaneously cache endpoint security information for the same user, providing sufficient regional endpoint security information caching coverage in the event the user visits one of the offices in the region.

When local access module 28 receives information about a user, e.g., user 22A from cache-alert device 150, local access module 28 may calculate the likelihood that, given the received information, user 22A will attempt to use a network resource provided by central servers 10 or local servers 30. Specifically, local access module 28 may provide the information to a behavior module 152. Behavior module 152 contains a predictive behavior model. This predictive behavior model may comprise a set of condition-action rules describing probable behaviors of users. For example, predictive behavior module 152 may contain a rule stating that, given that a user swiped an identity card through a badge reader, there is a 75% chance that the user will initiate an access right generation process in the next 30 minutes.

The condition-action rules in predictive behavior module 152 may be significantly more complex. For instance, a rule may use input from several cache-alert devices when calculating probabilities. Local access module 28 determines whether the probability exceeds a given threshold. If the probability exceeds the threshold, local access module 28 requests a set of endpoint security information for the user from access control server 14. For example, if the probability exceeds 50%, then local access module 28 sends a request to access control server 14.

Various embodiments of the invention have been described. For example, an embodiment has been described in which a freestanding intermediate network device hosts a local access module. Nevertheless, many variations and modifications may be made without departing from the principles of this invention. For instance, the functions described with respect to local access module 28 may be incorporated within one or more network devices of endpoint defense caching system 2, such as central servers 10, protection devices 18 or endpoint devices 20. These and other embodiments are within the scope of the following claims.

The invention claimed is:

1. A method of controlling access to a remote network resource by a plurality of local endpoint devices, the method comprising:
   locally caching, with an intermediate device, a set of endpoint security information maintained by a remote server, wherein the locally cached set of endpoint security information specifies one or more policies to control access to a remote network resource by a plurality of local endpoint devices, wherein the policies comprise a plurality of user role policies and a plurality of endpoint health policies, wherein each of the user role policies contains a mapping between a username and a list of roles associated with the username, and wherein each of the endpoint health policies provides a list of user roles that are incompatible with access to a network resource for endpoint devices having a particular security state; and
   controlling, with the intermediate device, access to the remote network resource by a first one of the endpoint devices based on the locally cached endpoint security information, an identity of a user of the first one of the endpoint devices, and a security state of the first one of the endpoint devices, wherein controlling access comprises:
   authenticating the user;
   in response to authenticating the user, determining the list of roles associated with the identity of the user based on the user role policies;
   removing invalid roles from the list of roles based on application of the one or more endpoint health policies to the security state of the first one of the endpoint devices;
   generating device-specific access rights for the first one of the endpoint devices based on remaining roles in the list of roles associated with the identity of the user after removing the invalid roles when there is at least one remaining role in the list of roles; and
   governing access to the remote network resource based on the device-specific access rights for the first one of the endpoint devices.

2. The method of claim 1, further comprising:
   receiving at the intermediate device authentication information about the user from the first one of the endpoint devices, wherein the authentication information specifies the identity of the user; and
   receiving at the intermediate device health information that describes the security state of the first one of the endpoint devices.

3. The method of claim 2, further comprising:
   authenticating the authentication information received from the first one of the endpoint devices to authenticate the user; and
   upon authenticating the user, identifying a plurality of roles defined for the user, wherein each role of the plurality of roles corresponds to membership in a group of users.

4. The method of claim 2, wherein the health information specifies whether a software application is installed on the first one of the endpoint devices.

5. The method of claim 4, wherein the software application is a virus.

6. The method of claim 2, wherein receiving health information comprises receiving health information from an endpoint defense agent installed on the first one of the endpoint devices.

7. The method of claim 6, further comprising:
   locally caching a current version of software that comprises the endpoint defense agent;
   determining whether the software that comprises the endpoint defense agent is current; and
   sending the locally cached version of the software to the first one of the endpoint devices subject to the determination.

8. The method of claim 2, wherein the authentication information comprises:
   a username for the user; and
   a password for the user.

9. The method of claim 8, wherein the password is a one-time password that is locally cached by the intermediate device.

10. The method of claim 2, further comprising forwarding the authentication information and the health information to the remote server when a network connection to the remote server is available, wherein the remote server controls access to the network resource on the basis of the endpoint security information, the authentication information, and the health information.

11. The method of claim 1, further comprising attempting to retrieve a portion of the endpoint security information from the remote server when the cached endpoint security information is not a current version of the endpoint security information maintained by the remote server.

12. The method of claim 3, wherein generating device-specific access rights comprises:
   determining which device-specific access rights to accord to the first one of the endpoint devices based on the identity of the user and the cached endpoint security information; and
   based on the locally cached endpoint security information and a failure of a health indicator within the health information from the first one of the endpoint devices, restricting the device-specific access rights to exclude at least one of the plurality of roles defined for the user.

13. The method of claim 1, wherein governing whether the first one of the endpoint devices may communicate comprises:
   locally caching a protection device policy from a remote server;
   sending the device-specific access rights for the endpoint device to a protection device; and
   sending the cached protection device policy to the protection device,
   wherein the protection device prohibits communications from the first one of the endpoint devices based on the set of protection device policies and the device-specific access rights for the first one of the endpoint devices.

14. The method of claim 13,
   wherein sending the device-specific access rights comprises sending a list of roles associated with the first one of the endpoint devices; and
   wherein sending a set of protection device policies comprises sending a mapping between actions to perform when the protection device receives a communication from the first one of the endpoint devices and a role associated with the first one of the endpoint devices.

15. The method of claim 13, wherein the protection device is an endpoint defense agent on the first one of the endpoint devices.

16. The method of claim 1, further comprising requesting a current version of the endpoint health policy from the remote server when the current version of the endpoint health policy is not cached locally.

17. The method of claim 1, further comprising requesting a current version of the user role policy for the user from the remote server when the current version of the user role policy is not cached locally.

18. The method of claim 1, further comprising
   determining whether the user is likely to attempt to access the network resource in the future; and
   requesting a portion of the endpoint security information based on the determination.

19. The method of claim 18, wherein determining whether the user is likely to attempt to access the network resource comprises:
   receiving data about activities of the user; and
   processing the data with a predictive behavior model to determine whether the user is likely to attempt to access the network resource.

20. The method of claim 19, wherein the predictive behavior model comprises a set of condition-action rules.

21. An intermediate network device coupled between a plurality of local endpoint devices and a remote network, the intermediate device comprising:
   a memory storing a local access module;
   a processor executing the local access module to locally cache a set of endpoint security information maintained by an access control server of the remote network,
   wherein the locally cached set of endpoint security information specifies one or more policies to control access to a network resource of the remote network by the plurality of local endpoint devices, wherein the policies include a plurality of user role policies and a plurality of endpoint health policies, wherein each of the user role policies contains a mapping between a username and a list of roles associated with the username, wherein each of the endpoint health policies provides a list of user roles that are incompatible with access to a network resource for endpoint devices having a particular security state, and
   wherein the local access module of the intermediate device controls access to the network resource by a first one of the endpoint devices based on the locally cached endpoint security information, an identity of a user of the first one of the endpoint devices, and a security state of the first one of the endpoint devices, and wherein to control access to the remote network resource, the local access module authenticates the user, in response to authenticating the user, determines the list of roles associated with the identity of the user based on the user role policies, removes invalid roles from the list of roles based on application of the endpoint health policies to the security state of the first one of the endpoint devices, generates device-specific access rights for the first one of the endpoint devices based on remaining roles in the list of roles associated with the identity of the user after removing the invalid roles when there is at least one remaining role in the list of roles, and governs access to the remote network resource based on the device-specific access rights.

22. The intermediate network device of claim 21, wherein the local access module comprises a control element to locally generate the device-specific access rights for the first one of the endpoint devices when communication with the access control server of the remote network fails.

23. The intermediate network device of claim 21, wherein the local access module further comprises:
   a user role policy engine to determine which user roles are associated with the user; and
   a health policy engine to determine which user roles are incompatible with access to the network resource, given the security state of the first one of the endpoint devices,
   wherein the control element generates the device-specific access rights based on the user roles returned by the user role policy engine and the health policy engine.

24. The intermediate network device of claim 23, wherein the user role policy engine requests a current version of a user role policy for the user in the endpoint security information from the remote server.

25. The intermediate network device of claim 23, wherein the user role policy engine comprises a user role policy cache to locally cache the user role policy,
   wherein the user role policy engine uses the user role policy for the user cached in the user role policy cache to determine which user role the user is a member of.

26. The intermediate network device of claim 23, wherein the health policy engine requests a current version of a health policy in the endpoint security information from the remote server.

27. The intermediate network device of claim 26, wherein the health policy engine comprises a health policy cache to locally cache the health policy, wherein the health policy engine uses the health policy cached in the health policy cache to generate a list of user roles that are incompatible with access of the first one of the endpoint devices to the network resource, given the security state of the first one of the endpoint devices.

28. The intermediate network device of claim 23, further comprising an authentication engine to authenticate the identity of the user.

29. The intermediate network device of claim 28, wherein the authentication engine requests a current version of authentication information for the user in the endpoint security information from the remote server.

30. The intermediate network device of claim 28, wherein the authentication engine comprises an authentication information cache to cache authentication information for the user, wherein the authentication engine uses the authentication information cached in the authentication information cache to determine whether to accept the user as the current user of the first one of the endpoint devices.

31. The intermediate network device of claim 23, wherein the local access module further comprises:
a protection device policy cache to locally cache a protection device policy in the endpoint security information; and
a protection device policy engine to request the protection device policy from a remote server when the protection device policy cache has not cached a current version of the protection device policy,
wherein the control element sends the protection device policy cached by the protection device policy cache to a protection device,
wherein the protection device prohibits communications from the first one of the endpoint devices based on the protection device policy and the device-specific access rights of the first one of the endpoint devices.

32. The intermediate network device of claim 31, wherein the protection device is an endpoint defense software agent executing on the first one of the endpoint devices.

33. The intermediate network device of claim 21, wherein the intermediate network device further comprises a network interface to receive authentication information about a user from the first one of the endpoint devices and to receive health information that describes the security state of the first one of the endpoint devices from the first one of the endpoint devices.

34. The intermediate network device of claim 33, wherein the health information specifies whether a software application is installed on the first one of the endpoint devices.

35. The intermediate network device of claim 33, wherein the software application comprises a virus.

36. The intermediate network device of claim 33, wherein the authentication information comprises:
a username for the user; and
a password for the user.

37. The intermediate network device of claim 33, wherein the local access module receives the health information from an endpoint defense agent installed on the first one of the endpoint devices.

38. The intermediate network device of claim 37, wherein the local access module further comprises an agent version module to locally cache a current version of software that comprises the endpoint defense agent and to determine whether the software that comprises the endpoint defense agent is current, and to send the locally cached version of the software to the first one of the endpoint devices subject to the determination.

39. The intermediate network device of claim 21, wherein the local access module forwards the authentication information and the health information to a remote server when a network connection to the remote server is available, wherein the remote server controls access to the network resource on the basis of a user role policy, an endpoint health policy, the authentication information, and the health information.

40. The intermediate network device of claim 21, wherein the local access module comprises a behavior module to determine whether the user is likely to attempt to access the network resource in the future and to request a portion of the endpoint security information based on the determination.

41. A system comprising:
a remote network having an access control server and a network resource;
an endpoint device coupled to a local network; and
an intermediate network device coupled to the local network and coupled between the endpoint device and the remote network,
wherein the intermediate network device comprises a local access module to locally cache a set of endpoint security information maintained by the access control server of the remote network,
wherein the locally cached set of endpoint security information specifies one or more policies to control access to the network resource of the remote network by the plurality of endpoint devices, wherein the policies include a plurality of user role policies and a plurality of endpoint health policies, wherein each of the user role policies contains a mapping between a username and a list of roles associated with the username, wherein each of the endpoint health policies provides a list of user roles that are incompatible with access to a network resource for endpoint devices having a particular security state, and
wherein the intermediate network device controls access to the network resource of the remote network by a first one of the endpoint devices based on the locally cached endpoint security information, an identity of a user of the first one of the endpoint devices, and a security state of the first one of the endpoint devices, and wherein to control access to the remote network resource, the intermediate network device authenticates the user, in response to authenticating the user, determines the list of roles associated with the identity of the user based on the user role policies, removes invalid roles from the list of roles based on application of the endpoint health policies to the security state of the first one of the endpoint devices, generates device-specific access rights for the first one of the endpoint devices based on remaining roles in the list of roles associated with the identity of the user after removing the invalid roles when there is at least one remaining role in the list of roles, and governs access to the remote network resource based on the device-specific access rights for the first one of the endpoint devices.

42. The system of claim 41, further comprising an agent that generates health information that describes the security state of the first one of the endpoint devices.

43. The system of claim 42, wherein the agent comprises a software module executing on the first one of the endpoint devices.

44. A non-transitory computer-readable storage medium comprising instructions for causing a programmable processor to:
locally cache, with an intermediate device, a set of endpoint security information maintained by a remote server, wherein the locally cached set of endpoint security information specifies one or more policies to control access to a remote network resource by a plurality of local endpoint devices, wherein the policies include a plurality of user role policies and a plurality of endpoint health policies, wherein each of the user role policies contains a mapping between a username and a list of roles associated with the username, wherein each of the endpoint health policies provides a list of user roles that are incompatible with access to a network resource for endpoint devices having a particular security state; and control, with the intermediate device, access to the remote network resource by a first one of the endpoint devices based on the locally cached endpoint security information, an identity of a user of the first one of the endpoint devices, and a security state of the first one of the endpoint devices, wherein the instructions to control access to the remote network resource comprise instructions to:

authenticate the user;

in response to authenticating the user, determine the list of roles associated with the identity of the user based on the user role policies;

remove invalid roles from the list of roles based on application of the endpoint health policies to the security state of the first one of the endpoint devices;

generate device-specific access rights for the first one of the endpoint devices based on remaining roles in the list of roles associated with the identity of the user after removing the invalid roles when there is at least one remaining role in the list of roles; and govern access to the remote network resource based on the device-specific access rights for the first one of the endpoint devices.

45. A system comprising:

a central office network comprising an access control server configured to maintain a set of endpoint security information for a user that specifies one or more policies for controlling access to a remote network resource, wherein the policies include a plurality of user role policies and a plurality of endpoint health policies, wherein each of the user role policies contains a mapping between a username and a list of roles associated with the username, wherein each of the endpoint health policies provides a list of user roles that are incompatible with access to a network resource for endpoint devices having a particular security state; and a local office network comprising an endpoint device associated with the user and an intermediate network device connected to the endpoint device and connected to the access control server, wherein the intermediate network device is configured to cache the set of endpoint security information, and to receive an authentication request from the endpoint device wherein the intermediate network device forwards the authentication request to the access control server;

when the intermediate network device receives a response from the access control server, the intermediate network device determines whether to grant the authentication request based on the response from the access control server; and when the intermediate network device does not receive a response from the access control server, the intermediate network device determines whether to grant the authentication request based on the cached set of endpoint security information, an identity of the user, and a security state of the endpoint device, wherein to determine whether to grant the authentication request, the intermediate network device authenticates the user, in response to authenticating the user, determines the list of roles associated with the identity of the user based on the user role policies, removes invalid roles from the list of roles based on application of the endpoint health policies to the security state of the first one of the endpoint devices, generates device-specific access rights for the first one of the endpoint devices based on remaining roles in the list of roles associated with the identity of the user after removing the invalid roles when there is at least one remaining role in the list of roles, and governs access to the remote network resource based on the device-specific access rights for the first one of the endpoint devices.

46. The method of claim 1, wherein at least one of the one or more policies denies access to users of a defined role when the users of the defined role are using an endpoint device that is hosting malicious software.

47. The method of claim 46, wherein the at least one of the one or more policies grants access to users of roles other than the defined role when the users of the roles other than the defined role are using an endpoint device that is hosting the malicious software.

48. The method of claim 1, wherein at least one of the one or more policies grants access to users of a defined role when the users of the defined role are using an endpoint device that is executing antivirus software.

* * * * *